United States Patent [19]

Sawa et al.

[11] Patent Number: 5,252,877
[45] Date of Patent: Oct. 12, 1993

[54] SLOT INSULATING MAGNETIC WEDGES

[75] Inventors: Takao Sawa; Yasuo Sakata, both of Kanagawa; Sadayoshi Hibino; Tadayuki Sato, both of Mie; Motoyasu Mochizuki, Aichi; Tadatomo Kimura; Shigeo Ozawa, both of Mie, all of Japan

[73] Assignee: Kabushiki Kaisha Toshiba, Kanagawa, Japan

[21] Appl. No.: 781,200

[22] PCT Filed: Jun. 27, 1991

[86] PCT No.: PCT/JP91/00865
§ 371 Date: Dec. 13, 1991
§ 102(e) Date: Dec. 13, 1991

[87] PCT Pub. No.: WO92/00625
PCT Pub. Date: Jan. 9, 1992

[30] Foreign Application Priority Data

Jun. 29, 1990 [JP] Japan ................ 2-068492[U]
Nov. 13, 1990 [JP] Japan ................ 2-117739[U]
Nov. 13, 1990 [JP] Japan ................ 2-117740[U]

[51] Int. Cl.⁵ .................................... H02K 3/48
[52] U.S. Cl. ........................................ 310/214
[58] Field of Search ............................. 310/214

[56] References Cited

U.S. PATENT DOCUMENTS 4,928,382 5/1990 Fujiwava et al. ............ 29/603
5,124,607 6/1992 Rieber et al. ................ 310/214

FOREIGN PATENT DOCUMENTS 688882 2/1940 Fed. Rep. of Germany .
1488728 6/1969 Fed. Rep. of Germany .
58-19138 7/1981 Japan .
58-22554 7/1981 Japan .
59-175350 3/1983 Japan .
59-18548 2/1984 Japan .
0161834 7/1988 Japan ........................... 310/214
0226243 10/1991 Japan ........................... 310/214
114638 4/1918 United Kingdom .
611867 11/1948 United Kingdom .

Primary Examiner—Steven L. Stephan
Assistant Examiner—C. LaBalle
Attorney, Agent, or Firm—Finnegan, Henderson, Farabow, Garrett & Dunner

[57] ABSTRACT

A slot insulating magnetic wedge inserted into the vicinity of the center of an opening portion of a stator slot, the slot insulating magnetic wedge being contacted with an inner surface of the stator slot of a motor. The slot insulating magnetic wedge comprises a non-magnetic insulating thin leaf shaped material and a magnetic material layer laminated on at least one surface of the non-magnetic insulating thin leaf shaped material, the electric resistance of the magnetic material layer being in the range from 10 $\mu\Omega.cm$ to 200 $\mu\Omega.cm$. The magnetic material layer comprises an amorphous magnetic alloy thin film, a Fe-based magnetic alloy thin ribbon having ultra fine crystalline particles, a crystalline magnetic alloy thin ribbon, a crystalline or amorphous magnetic alloy thin film produced by thin film forming technologies, or the like. The magnetic material layer with the electric resistance in the range from 10 $\mu\Omega.cm$ to 200 $\mu\Omega.cm$ is used as a magnetic wedge thereby to remarkably improve the efficiency of the motor. Since the construction of the magnetic wedge is simple and convenient, it can be easily manufactured and the reliability thereof can be remarkably improved.

11 Claims, 4 Drawing Sheets

SLOT INSULATING MAGNETIC WEDGES

TECHNICAL FIELD

The present invention relates to slot insulating magnetic wedges inserted in stator slots of a motor.

RELATED ART

In order to improve the efficiency and the power factor of a motor or to reduce electromagnetic vibration sound thereof, magnetic wedges are usually inserted into opening portions of stator slots. With the magnetic wedges inserted, a magnetic unbalance between the opening portions of the stators and the tooth portions thereof is removed. Thereby, the strain of magnetic flux in magnetic air gaps is decreased and a loss due to higher harmonic magnetic flux which takes place in the stator is suppressed. Consequently, various characteristics of the motor are improved.

FIG. 5 is a partial view showing principal portions of a motor using conventional magnetic wedges. In the figure, a stator slot 1 of the motor has an opening (1a) against a rotor 2. In the opening portion 1a, a magnetic wedge 3 with a trapezoidal section is inserted. This magnetic wedge is made of a substance where for example iron powder or ferrite powder is bound with resin or the like. The stator slot 1 houses a coil 4. Thus, the stator slot 1 also has a function for preventing the coil 4 from protruding therefrom.

The characteristics of the motor are generally improved in proportion to the amount of coil 4 housed in the slot 1. Thus, with respect to the magnetic wedge 3 with the trapezoidal section does nor have an effective sectional area of the slot 1 and thereby the effect of the magnetic wedge 3 being inserted cannot be satisfactorily obtained. In addition, since the magnetic wedge which is made up of a substance where magnetic powder is bound with resin or the like does not have an enough mechanical strength, it has a problem with respect to reliability thereof because of a chip and a crack when it is inserted in the stator slot or it is used.

To solve the above mentioned problems, as shown in FIG. 6, a unified construction of the magnetic wedge 5 where a ferrite 5b, which is a magnetic material, is coated on an insulating thin leaf shaped material 5a, which is used as a wedge material, has been proposed (refer to Japanese Utility Model Laid-Open Publication No. SHO 59(1984)-18548). In this construction, the effect of the magnetic wedge is fulfilled and the amount of coil which is housed in the slot is equal to that where the non-magnetic thin leaf shaped material is used as the wedge. In addition, in this construction, the wedge can also be automatically inserted into the stator slot.

However, the magnetic wedge, where the magnetic material such as ferrite is coated on the thin leaf shaped material, tends to peel off depending on the thickness of the coating layer or tends to chip or crack when it is inserted into the stator slot or it is used like the magnetic wedge made of a substance where magnetic powder is bound. In addition, with respect to the accomplishment of the high efficiency of the motor, the above mentioned construction does not provide an enough result. Thus, from such a viewpoint as well as the above mentioned problems, it was strongly desired to modify the above mentioned magnetic wedges.

On the other hand, magnetic wedges using an amorphous alloy thin strip as a magnetic material are disclosed in Japanese Patent Laid-Open Publication Nos. SHO 58(1983)-19138, SHO 58(1983)-22554, SHO 59(1984)-175350, and so forth. However, these magnetic wedges have the following problems. The Japanese Patent Laid-Open Publication No. SHO 58(1983)-19138 discloses a magnetic wedge 6 where a plurality of amorphous alloy thin strips 6a are laminated in a manner that the long side thereof is nearly parallel to the coil in the slot, while the short side thereof is nearly parallel to the center line of the section of the iron core. This magnetic wedge requires many steps to produce. In addition, since the mechanical strength required as the wedge should be obtained only with the adhesive strength of the lamination, the above mentioned wedge cannot provide enough strength. In addition, like the above mentioned magnetic wedge where the magnetic powder is bound with resin or the like, this wedge has other problems where the amount of coil housed in the slot is decreased and the effect of the magnetic wedge being inserted cannot be satisfactorily obtained.

Likewise, the magnetic wedge described in the Japanese Patent Laid-Open Document No. SHO 58(1983)-22554 requires many steps to produce. In addition, since the mechanical strength should be obtained only with the adhesive strength of the lamination, it is not satisfactory. Moreover, since the area of the wedge which occupies in the slot is large, the improvement of the effect of the wedge being inserted is not satisfactorily obtained. Moreover, since thin strips with different widths should be laminated, this magnetic wedge is not practical from the standpoint of the production steps.

On the other hand, as shown in FIG. 8, the magnetic wedge disclosed in the Japanese Patent Laid-Open Publication No. SHO 59(1984)-175350 is made by alternately laminating amorphous alloy thin strips 7a and synthetic resin layers 7b or synthetic resins 7b with magnetic powder. Thus, the magnetic wedge becomes thick and thereby high efficiency cannot be satisfactorily accomplished.

As were described above, since the mechanical strengths of the conventional magnetic wedges are small, the reliability thereof can be satisfactorily obtained. In addition, due to the shapes and the characteristics of the magnetic materials for the magnetic wedges, the efficiency of the motor cannot be satisfactorily improved. Thus, so far, the improvements of the above mentioned points have been strongly desired.

Therefore, the object of the present invention is to solve such problems and to provide slot insulating magnetic wedges which contribute to improve the efficiency of motors in a reduced space but with a high reliability.

DISCLOSURE OF THE INVENTION

The slot insulating magnetic wedge according to the present invention is a slot insulating magnetic wedge inserted in the vicinity of the center of an opening portion of a stator slot in such a manner that the slot insulating magnetic wedge is in contact with the inner surface of the starter slot of a motor, the slot insulating magnetic wedge comprising a non-magnetic insulating thin leaf shaped material and a magnetic material layer laminated on at least one surface of the non-magnetic insulating thin leaf shaped material, the electric resistance of the magnetic material layer being in the range from 10 $\mu\Omega.cm$ to 200 $\mu\Omega.cm$.

Since the slot insulating magnetic wedge according to the present invention is produced by laminating the above mentioned magnetic material layer with conductivity and the non-magnetic insulating thin leaf shaped material, the efficiency of the motor and the mechanical strength are improved. Thereby, the reliability is improved. In other words, even if the electric resistance is less than 10 $\mu\Omega$.cm or exceeds 200 $\mu\Omega$.cm, high efficiency cannot be obtained and thereby the effect of the magnetic wedge is decreased. The electric resistance of the magnetic material layer is preferably in the range from 20 $\mu\Omega$.cm to 180 $\mu\Omega$.cm. The electric resistance of the magnetic material layer is more preferably in the range from 40 $\mu\Omega$.cm to 160 $\mu\Omega$.cm.

In addition, although the thickness of the above mentioned magnetic material layer depends on the magnetic material for use, it is preferably 100 $\mu$m or less (excluding 0 $\mu$m). When the thickness of the magnetic material layer exceeds 100 $\mu$m, the material tends to decrease the reliability due to peeling off, and increase the area which occupies in the slot and thereby restricting high efficiency.

With respect to the slot insulating magnetic wedges according to the present invention, examples of the magnetic material layers with the above mentioned electric resistance are as follows:

(a) Amorphous magnetic alloy thin ribbon, (b) Fe-based magnetic alloy thin ribbon with ultra fine crystalline particles, (c) Crystalline magnetic alloy thin ribbon, and (d) Crystalline or amorphous magnetic thin film produced by thin film forming technologies such as the sputter method, the vacuum evaporation method, and the plating method.

When the magnetic alloy thin ribbons exemplified in (a) to (c) above are used as the magnetic material layers according to the present invention, as shown in FIG. 1, by binding a non-magnetic insulating thin leaf shaped material 11 and a magnetic alloy thin ribbon 12, a slot insulating magnetic wedge 13 according to the present invention is constructed. The non-magnetic insulating thin leaf shaped material 11 is bound with the magnetic alloy thin ribbon 12 by using a double-sided adhesive sheet or various adhesive agents. The thickness of the above magnetic alloy thin ribbons is preferably in the range from 1 $\mu$m to 100 $\mu$m. When the thickness of the layer is less than 1 $\mu$m, the mechanical strength which withstands the lamination cannot be obtained.

When the crystalline or the amorphous magnetic thin film as represented in (d) above is used as the magnetic material layer according to the present invention, it may be directly formed on the non-magnetic insulating thin leaf shaped material. As another method, a thin film which is formed by the CVD method or the plating method may be adhered with the non-magnetic insulating thin leaf shaped material so as to produce the slot insulating magnetic wedge. The thickness of the thin film layer obtained by the above mentioned thin film forming technologies is preferable in the range from 0.1 $\mu$m to 5 $\mu$m when the sputter method is used; and from 0.1 $\mu$m to 10 $\mu$m when the plating method is used. When the thickness of the layer is less than 0.1 $\mu$m, the magnetic flux necessary for the magnetic wedge cannot be satisfactorily obtained.

With respect to the non-magnetic insulating thin leaf shaped material 11, a polyester film, a polyethylene terephthalate film, a polyamide film, a polyimide film, an aromatic alamide paper, or the like may be used. The thickness of the non-magnetic insulating thin leaf shaped material 11 is preferably in the range from 10 $\mu$m to 500 $\mu$m although it depends on the thickness of the magnetic alloy thin ribbon (or the magnetic alloy thin film) 12. In other words, the magnetic alloy thin ribbon and the magnetic alloy thin film contribute to the improvement of the strength. In particular, when the amorphous magnetic alloy thin ribbon is used, it is possible to thin the insulating thin leaf shaped material.

When the slot insulating magnetic wedge 13 is actually used, it is curved as shown in FIG. 2 or bent in a "]" shape as shown in FIG. 3. Thereafter, as shown in FIG. 4, the slot insulating magnetic wedge 13 is inserted into an opening portion 14a of a stator slot 14 of the motor in such a manner that it is in contact with the inner surface of the stator slot 14. In this case, fundamentally, the slot insulating magnetic wedge 13 should be inserted into the stator slot 14 so that the non-magnetic insulating thin leaf shaped material 11 is oriented to the direction of the coil 15. In the figure, reference numeral 16 is a U-letter shaped insulating material. In addition, the magnetic alloy thin ribbon (or film) on which an inorganic type insulating layer or an organic type insulating layer is coated on the surface thereof can be inserted into the slot in such a manner that it is oriented to the coil.

In addition, by irradiating an energy beam such as an electron beam or a laser beam to the magnetic alloy thin ribbon (or the magnetic alloy thin film), it is scratched at a particular angle so as to mechanically provide an anisotropy property. Moreover, the magnetic anisotropy property can also be provided by a heating process in a magnetic field at a temperature less than the Curie temperature of the magnetic material for use. Furthermore, it is possible to form a metal film with a higher conductivity than the magnetic material for use on the surface of the magnetic material layer composed of the magnetic alloy thin ribbon or the magnetic alloy thin film. Thereby, the noise can be decreased. With respect to such a means, one of the plating method, the crimping method, the ultrasonic binding method, and so forth may be used. However, the plating method is preferable. The metal for the method is preferably copper, nickel, or an alloy thereof. The thickness of the metal is preferably 50 $\mu$m or less which depends on the ratio to the magnetic layer.

An example of the (a) amorphous magnetic alloy thin ribbon which satisfies the above mentioned electric resistance in the range from 10 $\mu\Omega$.cm to 200 $\mu\Omega$.cm is a Co-based amorphous alloy thin ribbon with a composition represented with the following formula (1).

General formula: $(Co_{1-a-b}M_a M'_b)_{100-c}X_c$     (1)

(where M is at least one element selected from Fe, Ni, and Mn; M' is at least one element selected from V, Nb, Ta, Cr, Mo, and W; X is at least one element selected from Si, B, P, and C; a, b, and c satisfy the relations of $0.01 \leq a \leq 0.2$, $0 \leq b \leq 0.1$, and 8 atomic $\% \leq c \leq 32$ atomic %, respectively).

The element M is used to adjust the saturation magnetostriction in accordance with Co. The element M can be adjusted in the range of $0.01 \leq a \leq 0.2$. The value of a is preferably in the range from 0.02 to 0.18. The value of a is more preferably in the range from 0.04 to 0.15. The element M' is effective for improving the magnetic characteristics and mechanical characteristics. However, when the amount of the element M' is too much, the Curie temperature becomes too low. Thus, the value of b is 0.1 or less. The value of b is preferably 0.08 or less. The value of b is more preferably 0.06 or less. In particular, when Cr is added at least partially, the corrosive resistance is improved and thereby a magnetic wedge with a high environmental resistance can be provided.

On the other hand, the element X is an element necessary to make the alloy amorphous. When the amount of the element X is less than 8 atomic %, it becomes difficult to make the alloy amorphous. Thereby, both the magnetic characteristics and the mechanical characteristics are degraded. On the other hand, when the amount of the element X exceeds 32 atomic %, the Curie temperature becomes too low. When an amorphous alloy thin strip is produced by so-called liquid quick cooling method such as single roll method, the amount of the element X is preferably in the range from 20 atomic % to 30 atomic %. The amount of the element X is more preferably in the range from 22 atomic % to 28 atomic %. The element X for use is preferably a combination of Si and B. The amount of B is in the range from 5 atomic % to 20 atomic %, while the amount of Si is in the range from 2 atomic % to 25 atomic %. When the Co-based amorphous alloy becomes a thin film by the plating method, the amount of the element X is preferably in the range from 9 atomic % to 20 atomic %. The amount of the element X is more preferably in the range from 10 atomic % to 18 atomic %. In this case, the element X preferably contains at least P.

In addition to the above mentioned Co-based amorphous alloy, an example of a Fe-based amorphous alloy thin ribbon with a composition represented with the following formula (2) can have an electric resistance similar to that which satisfies the above mentioned electric resistance condition.

General formula: $(Fe_{1-d} M''_d)_{100-e} X_e$ (2)

(where M" is at least one element selected from V, Nb, Ta, Cr, Mo, W, Ni, Co, and Cu; X is at least one element selected from Si, B, P, and C; and d and e are values which satisfy the relations of $0 \leq d \leq 0.1$ and 15 atomic $\% \leq e \leq 30$ atomic %, respectively).

The element M" is an element effective for improving the soft magnetic characteristics and the mechanical characteristics. However, when the value of d exceeds 0.1, the Curie temperature becomes too low. The value of d is preferably in the range from 0.01 to 0.08. The value of d is more preferably in the range from 0.02 to 0.06. In particular, when Cr is added, since the corrosive resistance is remarkably improved, the resultant alloy is preferable as a magnetic wedge. On the other hand, although the element X is an essential element for making the alloy amorphous, when the amount of the element X is less than 15 atomic % or exceeds 30 atomic %, it becomes difficult to make the alloy amorphous. The amount of the element X is preferably in the range from 17 atomic % to 28 atomic %. The amount of the element X is more preferably in the range from 20 atomic % to 25 atomic %. In addition, the element X is preferably a combination of Si and B. The amount of B is preferably in the range from 5 atomic % to 27 atomic %, while the amount of Si is preferably in the range from 3 atomic % to 25 atomic %.

With respect to such an amorphous alloy, an excellent effect as a magnetic wedge can be obtained with a saturated magnetic flux density in the range from 3 kG to 17.5 kG. For example, with respect to the above mentioned Co-based amorphous alloy, an even greater effect as a magnetic wedge can be obtained with a saturated magnetic flux density in the range from 3 kG to 12 kG. In particular, when the ribbon thickness is in the range from 1 μm to 5 μm, the saturated magnetic flux density is preferably in the range from 6 kG to 12 kG. When the ribbon thickness exceeds 5 μm, the saturated magnetic flux density is preferably in the range from 4 kG to 8 kG. In the case of the Fe-based amorphous alloy, the saturated magnetic flux density is preferably in the range from 7 kG to 17.5 kG. In such a case, the saturated magnetic flux density is more preferably in the range from 9 kG to 16 kG. In such a case, the saturated magnetic flux density is most preferably in the range from 10 kG to 14 kG.

The above mentioned amorphous magnetic alloy thin ribbon can be produced as a lengthy thin strip with a thickness of 3 μm to 100 μm by the so-called liquid quick cooling method such as the single roll method or the double roll method, which has been widely known. In particular, when a thin strip which has a thickness of 12 μm or less and which is free of pin holes or the like is produced, the above mentioned liquid quick cooling method is performed in a vacuum condition. Practically, the following conditions should be satisfied. By satisfying the conditions of a pressure lesser than atomic pressure, roll peripheral speed of 30 m/sec or more, an injection gas pressure in the range from 0.005 kg/cm² to 0.05 kg/cm², and a nozzle slit size in the range from 0.07 mm to 0.15 mm (x desired width of thin strip), the above mentioned amorphous magnetic alloy thin strip can be produced.

The above mentioned amorphous magnetic alloy thin ribbon can be kept in the quickly cooled state or heat treated at temperatures less than the crystallized temperature. In addition, the above mentioned amorphous magnetic alloy thin ribbon can be heat treated in a magnetic field so as to obtain a magnetic anisotropy property. However, it is preferable to use the thin ribbon kept in the quickly cooled state from the consideration of the improvement of the mechanical characteristics.

An example of the above mentioned (b) Fe-based magnetic alloy thin ribbon has a composition represented with the following formula (3) and ultra fine crystalline particles (Fe-bcc phase) with an average diameter of crystalline particles is 50 nm or less.

General formula: $Fe_{100-f-g-h-i-j} D_f E_g Si_h B_i Z_j$ (3)

(where D is at least one element selected from Cu and Au; E is at least one element selected from the IVa group elements, the V group elements, and the VI group elements; Z is at least one element selected from C, N, and P; and f, g, h, i, and j are values which satisfy the relations of 0.1 atomic $\% \leq f \leq 8$ atomic %, 0.1 atomic $\% \leq g \leq 10$ atomic %, 10 atomic $\% < h \leq 25$ atomic %, 4 atomic $\% \leq i \leq 12$ atomic %, and 0 atomic $\% \leq j \leq 3$ atomic %, respectively).

The element D is an element necessary for improving the soft magnetic characteristics such as core loss and magnetic permeability as well as improving the corrosive resistance and preventing crystalline particles from becoming large. In particular, the element D is effective for depositing the bcc phase at low temperatures. When the amount of the element D is too small, the above mentioned effect cannot be obtained. In contrast, when the amount of the element D is too large, the magnetic characteristics are degraded. Thus, the amount of the element D is in the range from 0.1 atomic % to 8 atomic %. The amount of the element D is preferably in the range from 0.1 atomic % to 5 atomic %.

The element E is effective for decreasing the magnetic strain and the magnetic anisotropy property, and improving the soft magnetic characteristics and magnetic characteristics against a temperature change as well as equalizing the diameter of crystalline particles. By adding the element E along with the element D, the bcc phase can be stabled in a wide range. When the amount of the element D is too small, the above mentioned effect cannot be obtained. In contrast, when the amount of the element D is too large, the alloy cannot be kept amorphous in the production step and thereby the saturated magnetic flux density becomes small. Thus, the amount of the element E is preferably in the range from 0.1 atomic % to 10 atomic %. The amount of the element E is more preferably in the range from 1 atomic % to 8 atomic %. Ta, Nb, W, and Mo of the element E remarkably improve the soft magnetic characteristics, while V remarkably improves the brittle resistance and surface property. Thus, they are preferable elements.

Si and B are elements that contribute to making the alloy amorphous in the production step and are effective in a heat treatment for improving the magnetic characteristics. In particular, Si is solid dissolved into Fe, which is a major component of the fine crystalline particles, and contributes to decreasing the magnetic strain and the magnetic anisotropy property. When the amount of Si is less than 10 atomic %, the soft magnetic characteristics are not remarkably improved. When the amount of Si exceeds 25 atomic %, the effect of the ultra quick cooling becomes small and thereby allowing relatively large crystalline particles of $\mu$m to be deposited. Thus, the good soft magnetic characteristics are not obtained. In addition, Si is an essential element for constructing a super lattice. To accomplish the super lattice, the amount of Si is preferably in the range from 12 atomic % to 22 atomic %. When the added amount of B is less than 3 atomic %, relatively large crystalline particles are deposited and thereby proper soft magnetic characteristics cannot be obtained. When the added amount of B exceeds 12 atomic %, with a heat treatment, a compound of B tends to be deposited and thereby the soft magnetic characteristics are degraded. In addition, C, N, and P of 5 atomic % or less may be included as another amorphous forming element (element Z). The total amount of Si, B, and another amorphous forming element is preferably in the range from 15 atomic % to 30 atomic %. In addition, to obtain the excellent soft magnetic characteristics, the relation of Si/B$\geq$1 should be satisfied. In particular, when the amount of Si is in the range from 13 atomic % to 21 atomic %, the magnetostriction $\lambda$s becomes almost zero. Thus, the magnetic characteristics due to a strain which takes place in after-treatment are not almost degraded.

The Fe-based magnetic alloy thin ribbon with the ultra fine crystalline particles can be produced in the following manner similar to that of the above mentioned amorphous magnetic alloy thin strip. First, an amorphous thin strip is produced. Thereafter, the amorphous thin strip is heat treated and then fine crystalline particles in the bcc phase whose average particle diameter is 50 nm or less are deposited. This alloy can be heat treated in a magnetic field so as to obtain the magnetic anisotropy property. The average diameter of crystalline particles D is obtained by the following Scherrer equation with the line width obtained from the X ray diffraction.

$$D = K \cdot \lambda / \beta \cos \theta$$

(where $\lambda$ is a wavelength of X ray; $\theta$ is a Bragg angle; and K is a constant of proportion).

With respect to the above mentioned (c) crystalline magnetic alloy thin ribbon which satisfies an electric resistance in the range from 10 $\mu\Omega$.cm to 200 $\mu\Omega$.cm, examples of crystalline magnetic alloy thin ribbons with compositions represented with the following formulas (4) and (5).

General formula: $Ni_{100-k-m} Fe_k G_m$ (4)

(where G is at least one element selected from Ti, Zr, Hf, V, Nb, Ta, Cr, Mo, W, Mn, Si, Al, Co, and Cu; and k and m are values which satisfy the relations of 15 atomic % $\leq$ k $\leq$ 25 atomic % and 0 atomic % $\leq$ m $\leq$ 10 atomic %, respectively).

When the amount of Fe is in the range from 15 atomic % to 25 atomic %, the soft magnetic characteristics are not adversely degraded in the production step. Furthermore, an addition of the element G improves the mechanical strength. Moreover, the strength as a magnetic wedge by adhesion with the non-magnetic insulating thin leaf shaped material also increases.

General formula: $Fe_{100-n} Si_n$ (5)

(where n is a value which satisfies the relation of 0.1 atomic % $\leq$ n $\leq$ 12 atomic %).

When the amount of Si exceeds 12 atomic %, it becomes difficult to thin the alloy. In addition, when the amount of Si is less than 0.1 atomic %, the soft magnetic characteristics cannot be satisfactorily obtained. The amount of Si is preferably in the range from 1 atomic % to 10 atomic %. The amount of Si is more preferably in the range from 2 atomic % to 8 atomic %.

By repeatedly rolling the crystalline magnetic alloy thin ribbon with the multi-staged rolling method or the like, a ribbon with a desired thickness can be obtained. The thickness of the crystalline alloy ribbon is preferably in the range from 20 $\mu$m to 100 $\mu$m. In this case of such a crystalline alloy, after the ribbon is rolled, a heat treatment may be conducted or may be omitted. However, it is preferable to use a heat treated material.

With respect to the above mentioned magnetic alloy thin ribbons, it is preferable to use the Co-based amorphous alloy thin ribbon from the consideration of improvements of the electric resistance, the soft magnetic characteristics, and the mechanical strength.

In addition, by using the thin film forming technologies such as the above mentioned (d) sputter method, the CVD method, and the plating method, a crystalline or amorphous thin film with a thickness of about 1 $\mu$m to 10 $\mu$m can be obtained. Thereby, an effect similar to the above mentioned magnetic thin ribbons can be obtained. In the case of sputter method, by using the conventional method such as the magnetron sputter method, or the high frequency sputter method, the above mentioned thin film can be formed on a non-magnetic insulating thin leaf shaped material to obtain a magnetic wedge. As the materials for forming the thin film by the sputter method, the amorphous magnetic alloys represented by the formulas (1) and (2), the Fe-based magnetic alloys represented by the formula (3), the crystalline magnetic alloys represented by the formulas (4) and (5), and so forth can be used. However, the amorphous magnetic alloys with the composition represented with the following formula (6) are preferable.

General formula: $Co_{100-p}Q_p$      (6)

(where Q is at least one element selected from Ti, Zr, Hf, V, Nb, Ta, Cr, Mo, and W; and p is a value which satisfies the relation of 6 atomic % $\leq$ p $\leq$ 28 atomic %.)

The element Q is an element effective for making the alloy amorphous. When the amount of the element Q is less than 6 atomic %, it is difficult to make the alloy amorphous. When the amount of the element Q exceeds 28 atomic %, the Curie temperature becomes too low. The amount of the element Q is preferably in the range from 8 atomic % to 25 atomic %. The amount of the element Q is more preferably in the range from 10 atomic % to 23 atomic %. In particularly, preferable combinations of Q are Nb+Zr and Mo+Zr. Part of Co may be replaced by Fe or Ni. In this case, the amount of replacement should be 5 atomic % or less.

In the case of plating method, after each of above mentioned magnetic alloys is deposited on the electrode, a plated film is peeled off from the electrode and then bound with the non-magnetic insulating thin leaf shaped material. Thereby, a magnetic wedge can be formed. As another method, it is possible to directly deposit a plated film on the non-magnetic insulating thin leaf shaped material and thereby forming a magnetic wedge. For example, when a Co—Fe—P amorphous plated film is made, the composition of the electrocrystallization bathing is adjusted with $FeCl_2$, $CoSO_4$, $H_3PO_3$, $H_3BO_3$, and $C_6H_4(OH)_2$ so as to obtain a desired composition. By controlling pH to approximately 1.4, the plated film is formed. Likewise, in the case of CVD method, by directly forming the magnetic thin film on the insulating resin thin leaf shaped material, a magnetic wedge can be made.

As was described above, by using magnetic alloy thin ribbons or magnetic alloy thin films with electric resistances in the range from 10 $\mu\Omega$.cm to 200 $\mu\Omega$.cm, slot insulating magnetic wedges in very simple and convenient constructions can be obtained. In addition, since the slot insulating magnetic wedges according to the present invention are very simple in constructions, as mentioned above, and the magnetic alloy thin ribbons and the magnetic alloy thin films contribute to the improvement of the strength thereof, a very high reliability can be achieved. Moreover, since the non-magnetic insulating thin leaf shaped materials can be thinned, the wedges themselves can be thinned. Since the slot insulating magnetic wedges according to the present invention use magnetic materials with electric resistances in the range from 10 $\mu\Omega$.cm to 200 $\mu\Omega$.cm, the efficiency can be improved. In addition, since they can be thinned, their insertion spaces can decrease. Thus, the effect as the magnetic wedges can be satisfactorily obtained. Consequently, the efficiency of the motors can be much effectively improved. Moreover, since the constructions of the magnetic wedges are simple, they can be easily produced and their reliability can be improved.

MODES FOR CARRYING OUT THE INVENTION

Figure 1:
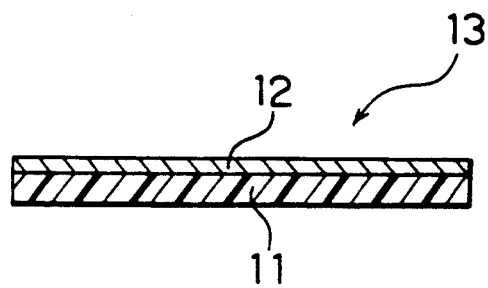
FIG. 1 is a sectional view showing a construction of a slot insulating magnetic wedge of an embodiment according to the present invention.
Figure 2:
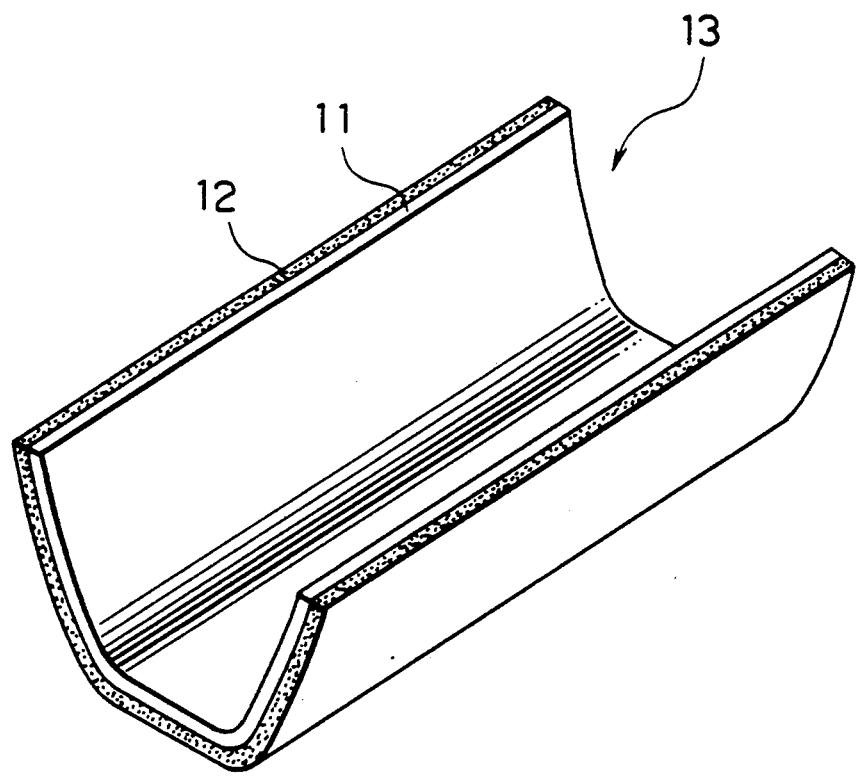
FIG. 2 is a perspective view showing a mode for use of the slot insulating magnetic wedge.
Figure 3:
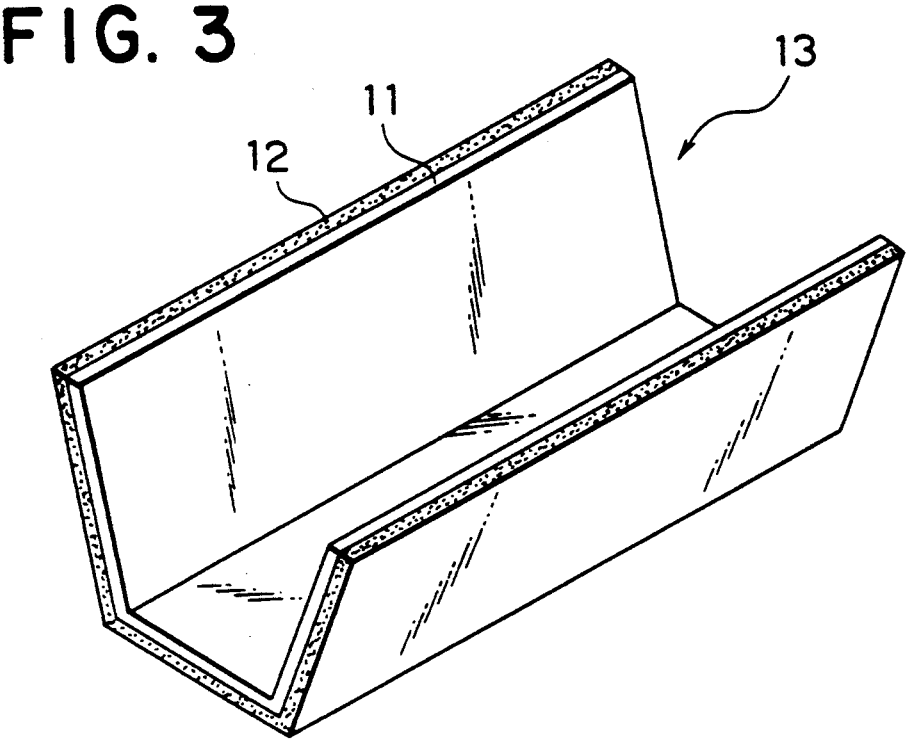
FIG. 3 is a perspective view showing another mode for use of the slot insulating magnetic wedge.
Figure 4:
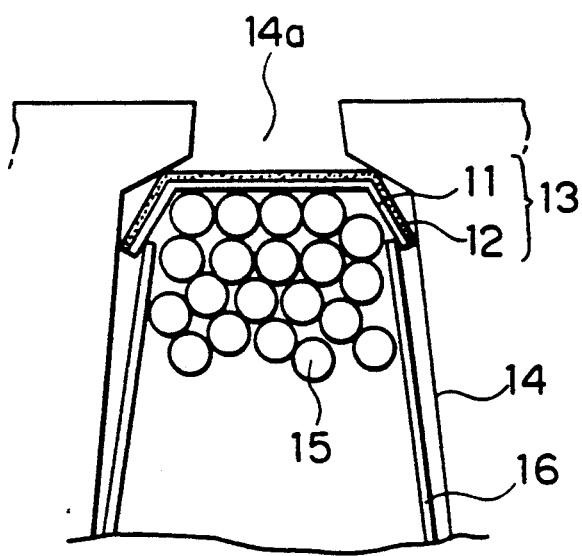
FIG. 4 is a plan view describing a mode for use of the slot insulating magnetic wedge of the embodiment according to the present invention.
Figure 5:
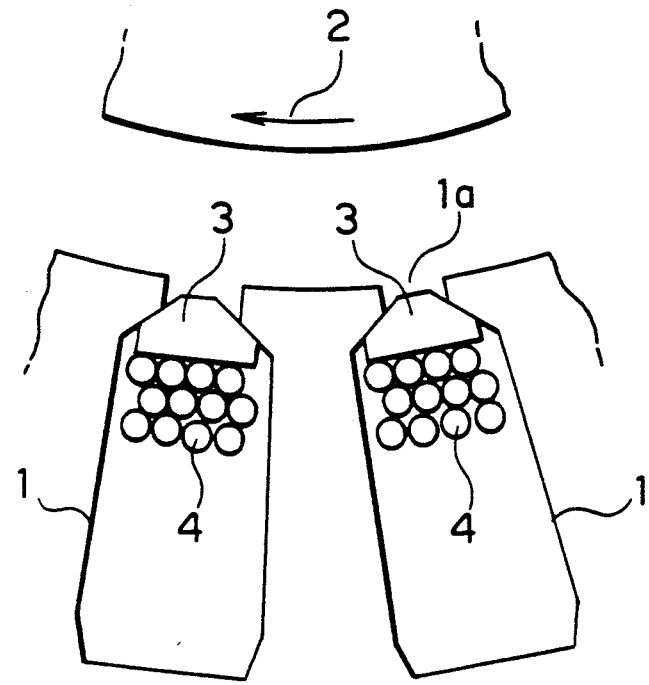
FIG. 5 is a plan view showing a conventional magnetic wedge along with a stator slot.
Figure 6:
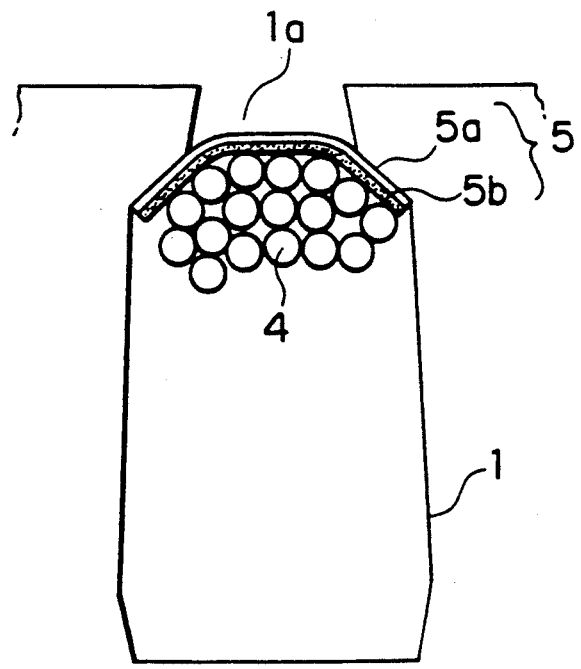
FIG. 6 is a plan view showing another conventional magnetic wedge.
Figure 7:
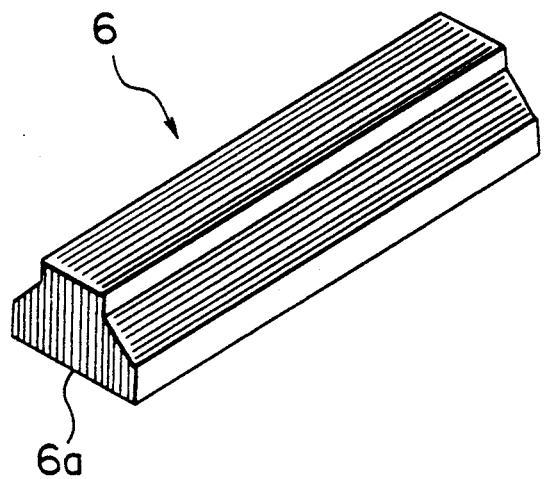
FIG. 7 is a perspective view showing still another conventional magnetic wedge.
Figure 8:
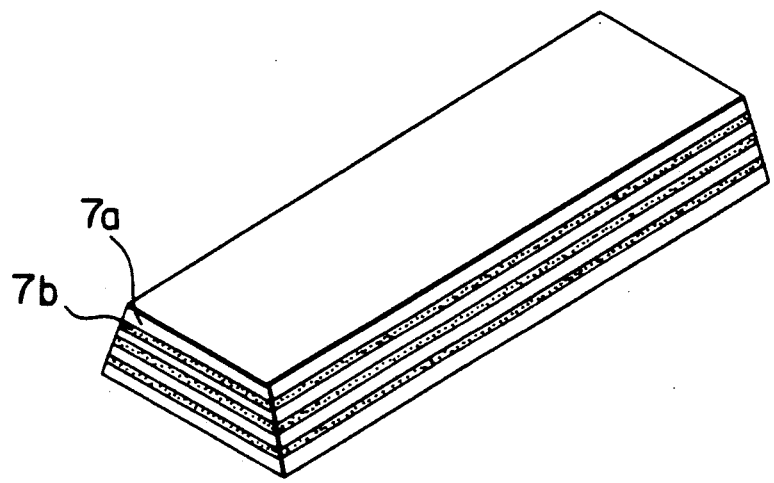
FIG. 8 is a perspective view showing still further another conventional magnetic wedge.

Now, embodiments according to the present invention will be described. All compositions described in the following use atomic %.

Embodiment 1

A 15 $\mu$m thick amorphous alloy thin ribbon with a composition represented with $(Co_{0.93}Fe_{0.05}Nb_{0.02})_{74}(Si_{0.55}B_{0.45})_{26}$ (electric resistance=120 $\mu\Omega$.cm, saturated magnetic flux density=6.3 kG) was produced in an air atmosphere by using the single roll method. Thereafter, the amorphous alloy thin ribbon and a 0.2 mm thick polyester film were adhered with an elastic adhesive agent of epoxy type and thereby an insulating magnetic wedge which was 10 mm wide by 100 mm long was made. The amorphous alloy thin ribbon was used in a quickly cooled state.

The insulating magnetic wedge thus obtained was bent and then inserted into each slot portion of a 4-pole 2.2 kW motor. In this state, the efficiency of the motor was evaluated.

For comparison, a 0.25 mm thick polyester film as a comparison wedge was inserted into the same portions of the motor. Thereafter, the same evaluation was made. The efficiency of the motor was evaluated by measuring the number of revolution and the torque thereof with a torque meter on the output side. The ratio P to the power on the input side was calculated by using the following equation.

P=975×T/r (where T=torque (kg·m); and r=number of revolution (rpm))

As the result, while the efficiency of the comparison wedge was 82.2%, that of the magnetic wedge according to the embodiment was 83.2%. Thereby, it was found that the efficiency was remarkably improved. In the field of motors, the improvement of efficiency by 1% was an epoch-making matter.

Embodiment 2

A 6 $\mu$m thick amorphous alloy thin ribbon with a composition represented with $(Co_{0.91}Fe_{0.05}Cr_{0.04})_{75}(Si_{0.55}B_{0.45})_{25}$ (electric resistance=115 $\mu\Omega$.cm; and saturated magnetic flux density=5.8 kG) was made in a vacuum atmosphere by using the single roll method.

The production conditions were in that the dimensions of a slit nozzle were 11 mm×0.15 mm, the roll peripheral speed was at 50 m/sec, the roll material was Fe, the injection gas pressure was 0.01 kg/cm$^2$, and the degree of vacuum was at $1 \times 10^{-5}$ Torr Thereafter, the amorphous alloy thin ribbon obtained was adhered with a 0.2 mm thick polyethylene terephthalate (PET) film by using an adhesive agent of urethane type. Thereby, a magnetic wedge of 10 mm wide by 100 mm long was made. In this case, two types of strips were made. As one type, the strip was quickly cooled. As another type, the strip was heat treated at 440° C. for 30 minutes so as to remove the strain thereof, and then the strip was gradually cooled. By using two types of the strips, the magnetic wedges were made.

These magnetic wedges were bent in a "]" shape and then inserted into each slot portion of the motor in the same manner as in the embodiment 1. Thereafter, the efficiency of the motor was evaluated with respect to the two types of magnetic wedges. In addition, as a comparison example, wedges whose shapes are the same as those described above were made only of a 0.25 mm PET film and then the efficiencies thereof were evaluated. Table 1 shows the results of the above mentioned evaluations.

TABLE 1

| | Wedge | Efficiency (%) |
|---|---|---|
| Embodiment 2 | Quickly cooled amorphous alloy thin strip | 83.8 |
| Embodiment 2 | Heat treated amorphous alloy thin strip | 84.0 |
| Comparison | Only PET | 82.2 |

TABLE 1-continued

| | Wedge | Efficiency (%) |
|---|---|---|
| example 2 | | |

As clearly shown in Table 1, it is found that when the magnetic wedges according to the embodiment 2 are used, a high efficiency can be obtained.

Embodiment 3

By using the magnetic alloys shown in Table 2, magnetic wedges having constructions shown in Table 2 were made and the efficiencies thereof were evaluated with the same motor used in the embodiment 1. The dimensions of the wedges were 10 mm width by 100 mm long. The ribbon materials with a thickness exceeding 12 μm were made in an air atmosphere by the single roll method. The ribbon materials with a thickness in the range from 5 μm to 12 μm were made in a vacuum atmosphere by the single roll method. The ribbon materials with a thickness less than 5 μm were formed directly on insulating thin leaf shaped materials by the plating method or the sputter method thereby to produce magnetic wedges. The magnetic alloy thin ribbons with a thickness of 5 μm or more were adhered to insulating thin leaf shaped materials with an adhesive agent of urethane type. Part of materials were heat treated in advance so as to remove the strain thereof.

In addition, as comparison examples, conventional magnetic wedges were made and then the efficiencies thereof were evaluated with the same motor as that used in the embodiment 1.

Table 2 also shows the evaluation results. As clearly shown in Table 2, when the magnetic wedges according to the embodiment 3, the efficiencies are remarkably improved. Thus, it is found that the magnetic wedges according to the embodiment 3 are very effective.

TABLE 2

EMBODIMENT 3

| SAMPLE NO. | ALLOY COMPOSITION | ELECTRIC RESISTANCE ($\mu\Omega \cdot cm$) | SATURATED MAGNETIC FLUX | THICKNESS ($\mu m$) | CONSTRUCTION | EFFICIENCY (%) |
|---|---|---|---|---|---|---|
| 1 | $(Co_{0.95}Fe_{0.05})_{72}(Si_{0.5}B_{0.5})_{28}$ | 130 | 5.8 | 19.8 | THE ALLOY IS LAMINATED WITH A 0.2 mm THICK PET. | 83.1 |
| 2 | $(Co_{0.95}Fe_{0.05})_{71}(Si_{0.4}B_{0.6})_{29}$ | 140 | 5.2 | 13.3 | THEREAFTER, A 2 $\mu m$ THICK INSULATING LAYER IS | 83.5 |
| 3 | $(Co_{0.95}Fe_{0.05})_{74}(Si_{0.3}B_{0.7})_{26}$ | 125 | 6.7 | 7.1 | COATED ON THE RESULTANT THIN STRIP. | 84.1 |
| 4 | $(Co_{0.95}Fe_{0.05})_{76}(Si_{0.3}B_{0.7})_{24}$ | 120 | 8.2 | 9.3 | | 84.0 |
| 5 | $(Co_{0.95}Fe_{0.05})_{78}(Si_{0.3}B_{0.7})_{22}$ | 115 | 8.8 | 6.5 | | 84.3 |
| 6 | $(Co_{0.91}Fe_{0.06}Ni_{0.03})_{73}(Si_{0.6}B_{0.4})_{27}$ | 125 | 6.1 | 5.5 | Cu IS COATED ON A THIN STRIP OF THIS ALLOY BY THE PLATING METHOD. THEREAFTER, THE RESULTANT THIN STRIP IS LAMINATED WITH A 0.2 mm THICK PET. | 84.2 |
| 7 | $(Co_{0.94}Fe_{0.03}Mn_{0.03})_{73}(Si_{0.6}B_{0.4})_{27}$ | 125 | 6.3 | 12.4 | | 84.0 |
| 8 | $(Co_{0.92}Fe_{0.05}Ta_{0.03})_{75}(Si_{0.6}B_{0.4})_{25}$ | 120 | 7.3 | 5.4 | THIS ALLOY IS LAMINATED AND ADHERED WITH A 0.2 mm THICK PET IN A " " SHAPE. | 84.6 |
| 9 | $(Co_{0.92}Fe_{0.05}V_{0.03})_{75}(Si_{0.6}B_{0.4})_{25}$ | 130 | 6.8 | 8.7 | THIS ALLOY IS LAMINATED AND ADHERED WITH A 0.2 mm THICK PET IN A " " SHAPE. (HEAT TREATMENT FOR REMOVING STRAIN) | 84.9 |
| 10 | $(Co_{0.92}Fe_{0.05}V_{0.03})_{77}(Si_{0.6}B_{0.4})_{23}$ | 125 | 8.1 | 7.7 | THIS ALLOY IS LAMINATED AND ADHERED WITH A 0.2 mm THICK PET IN A " " SHAPE. | 84.6 |
| 11 | $(Co_{0.93}Fe_{0.05}Mo_{0.02})_{76}(Si_{0.3}B_{0.7})_{24}$ | 125 | 7.5 | 9.3 | A LASER BEAM IS IRRADIATED AT AN ANGLE OF 80° IN THE LONGITUDINAL DIRECTION OF THE THIN STRIP OF THIS ALLOY. THEREAFTER, THE RESULTANT THIN STRIP IS LAMINATED AND ADHERED WITH A 0.2 mm THICK PET. | 84.2 |
| 12 | $(Co_{0.93}Fe_{0.05}Cr_{0.02})_{77}(Si_{0.5}B_{0.5})_{23}$ | 120 | 8.3 | 5.8 | A HEAT TREATMENT IS PERFORMED IN A MAGNETIC FIELD IN THE DIRECTION OF THE WIDTH OF THE THIN STRIP OF THIS ALLOY. THEREAFTER, THE RESULTANT THIN STRIP IS LAMINATED AND ADHERED WITH A 0.2 mm THICK PET. | 84.5 |
| 13 | $Fe_{78}Si_8B_{14}$ | 120 | 15.4 | 16.5 | THIS ALLOY IS LAMINATED AND ADHERED WITH A 0.2 mm THICK PET. THEREAFTER THE RESULTANT ALLOY IS BENT AND THEN INSERTED INTO EACH SLOT PORTION. | 83.5 |
| 14 | $Fe_{81}Si_6B_{13}$ | 120 | 15.8 | 18.1 | | 83.5 |
| 15 | $Fe_{75}Si_{11}B_{14}$ | 125 | 15.2 | 7.1 | | 83.5 |
| 16 | $(Fe_{0.95}Cr_{0.05})_{81}(Si_{0.3}B_{0.7})_{19}$ | 115 | 12.7 | 15.4 | | 83.4 |
| 17 | $(Fe_{0.95}Mo_{0.05})_{81}(Si_{0.3}B_{0.7})_{19}$ | 115 | 12.5 | 10.8 | | 83.2 |
| 18 | $(Fe_{0.94}Mb_{0.06})_{79}(Si_{0.4}B_{0.6})_{21}$ | 120 | 11.6 | 6.9 | | 83.9 |
| 19 | $(Fe_{0.94}W_{0.06})_{79}(Si_{0.4}B_{0.6})_{21}$ | 120 | 11.5 | 5.8 | THIS ALLOY IS LAMINATED AND ADHERED WITH A 0.2 mm THICK PET IN A " " SHAPE | 83.8 |
| 20 | $(Fe_{0.98}Cu_{0.02})_{77}(Si_{0.4}B_{0.6})_{23}$ | 125 | 14.8 | 7.1 | | 83.8 |
| 21 | $(Fe_{0.98}V_{0.02})_{77}(Si_{0.4}B_{0.6})_{23}$ | 125 | 14.8 | 17.5 | THE ALLOY IS LAMINATED WITH A 0.2 mm THICK PET. THEREAFTER, A 2 $\mu m$ THICK INSULATING LAYER IS COATED ON THE RESULTANT THIN STRIP. | 83.1 |
| 22 | $(Fe_{0.95}Ta_{0.05})_{80}(Si_{0.3}B_{0.7})_{20}$ | 120 | 12.7 | 20.2 | | 83.4 |
| 23 | $(Fe_{0.8}Ni_{0.2})_{77}(Si_{0.3}B_{0.7})_{23}$ | 120 | 14.0 | 12.8 | Cu IS COATED ON A THIN STRIP OF THIS ALLOY BY THE PLATING METHOD. THEREAFTER, THE RESULTANT THIN STRIP IS LAMINATED WITH A 0.2 mm THICK PET. | 83.9 |
| 24 | $(Fe_{0.95}Co_{0.05})_{75}(Si_{0.3}B_{0.7})_{25}$ | 125 | 15.7 | 8.2 | | 84.0 |
| 25 | $(Fe_{0.9}Ni_{0.1})_{78}(Si_{0.2}B_{0.8})_{22}$ | 125 | 14.3 | 8.4 | A LASER BEAM IS IRRADIATED IN THE LONGITUDINAL DIRECTION OF THE THIN STRIP OF THIS ALLOY. THEREAFTER, THE RESULTANT THIN STRIP IS LAMINATED AND ADHERED WITH A 0.2 mm THICK PET. | 84.1 |
| 26 | $(Fe_{0.9}Co_{0.1})_{74}(Si_{0.6}B_{0.4})_{26}$ | 130 | 15.1 | 6.3 | A HEAT TREATMENT IS PERFORMED IN A MAGNETIC FIELD IN THE DIRECTION OF THE WIDTH OF THE THIN STRIP OF THIS ALLOY. THEREAFTER, THE RESULTANT THIN STRIP IS LAMINATED AND ADHERED WITH A 0.2 mm | 84.3 |

TABLE 2-continued

| SAMPLE NO. | ALLOY COMPOSITION | ELECTRIC RESISTANCE ($\mu\Omega \cdot cm$) | SATURATED MAGNETIC FLUX | THICKNESS ($\mu m$) | CONSTRUCTION | EFFICIENCY (%) |
|---|---|---|---|---|---|---|
| 27 | $Co_{82}Fe_5P_{13}$ | 100 | 12.0 | 1.9 | THIS ALLOY IS FORMED ON A 0.2 mm THICK PET BY THE PLATING METHOD. THE RESULTANT ALLOY IS BENT AND THEN INSERTED. | 84.1 |
| 28 | $Co_{80}Fe_5P_{13}B_2$ | 105 | 11.7 | 2.7 | THIS ALLOY IS FORMED ON A 0.2 mm THICK PET BY THE PLATING METHOD. THE RESULTANT ALLOY IS BENT AND THEN INSERTED. | 84.0 |
| 29 | $Co_{75}Fe_5Mo_3P_{15}B_2$ | 110 | 9.8 | 3.2 | | 83.9 |
| 30 | $Co_{75}Fe_5Cr_3P_{15}B_2$ | 110 | 9.7 | 4.4 | | 83.8 |
| 31 | $Co_{80}Fe_5P_{15}$ | 105 | 11.8 | 2.2 | THIS ALLOY IS FORMED ON A 0.2 mm THICK PET BY THE PLATING METHOD. A LASER BEAM IS IRRADIATED AT AN ANGLE OF 70° TO THE LONGITUDINAL DIRECTION OF THE WEDGE AND THEREBY PROVIDING A MAGNETIC ANISOTROPY PROPERTY. | 83.9 |
| 32 | $Co_{78}Nb_9Zr_{13}$ | 115 | 8.7 | 1.5 | THIS ALLOY IS FORMED ON A 0.2 mm THICK PET BY THE SPATE METHOD. THE RESULTANT ALLOY IS BENT AND THEN | 83.5 |
| 33 | $Co_{78}Mo_9Ni_3Zr_{13}$ | 115 | 8.9 | 2.1 | | 83.3 |
| 34 | $Co_{78}Ta_8Mo_5Zr_9$ | 120 | 8.8 | 1.9 | THIS ALLOY IS FORMED ON A 0.2 mm THICK PET BY THE PLATING METHOD. A LASER BEAM IS IRRADIATED AT AN ANGLE OF 80° TO THE LONGITUDINAL DIRECTION OF THE WEDGE AND THEREBY PROVIDING A MAGNETIC ANISOTROPY PROPERTY. | 83.7 |
| 35 | $Fe_{74}Cu_1Nb_3Si_{14}B_8$ (ULTRA FINE CRYSTAL) | 95 | 13.4 | 13.8 | THIS ALLOY IS LAMINATED AND ADHERED WITH A 0.2 mm THICK PET IN A " " SHAPE. | 83.4 |
| 36 | $Fe_{72}Cu_1Mo_2Si_{15}B_9$ (ULTRA FINE CRYSTAL) | 95 | 13.3 | 6.2 | | 84.1 |
| 37 | $Fe_{75}Cu_1Ta_3Si_{15}B_6$ (ULTRA FINE CRYSTAL) | 95 | 14.5 | 8.1 | Cu IS COATED ON A THIN STRIP OF THIS ALLOY BY THE PLATING METHOD. THEREAFTER THE RESULTANT THIN STRIP IS LAMINATED WITH A 0.2 mm THICK PET. | 83.8 |
| 38 | $Fe_{72}Au_1W_3Si_{15}B_9$ (ULTRA FINE CRYSTAL) | 95 | 13.5 | 8.3 | THE ALLOY IS LAMINATED WITH A 0.2 mm THICK PET. THEREAFTER, A $2\mu$ THICK INSULATING LAYER IS COATED ON THE RESULTANT THIN STRIP. | 83.8 |
| 39 | $Fe_{73}Cu_2Mo_4Si_{12}B_9$ (ULTRA FINE CRYSTAL) | 95 | 12.7 | 18.5 | | 83.4 |
| 40 | $Fe_{72}Cu_1V_6Si_{13}B_8$ (ULTRA FINE CRYSTAL) | 95 | 13.1 | 10.5 | | 83.7 |
| 41 | $(Fe_{0.92}Co_{0.08})_{74}Cu_1Nb_3Si_{14}B$ (ULTRA FINE CRYSTAL) | 95 | 14.6 | 17.1 | THIS ALLOY IS LAMINATED AND ADHERED WITH A 0.2 mm THICK PET IN A " " SHAPE. | 83.2 |
| 42 | $(Fe_{0.92}Ni_{0.08})_{74}Cu_1Ta_3Si_{14}B_8$ (ULTRA FINE CRYSTAL) | 95 | 12.8 | 8.3 | | 83.8 |
| 43 | $Fe_{72}Cu_1V_6Si_{14}B_7$ (ULTRA FINE CRYSTAL) | 95 | 13.0 | 5.7 | THIS ALLOY IS HEAT TREATED AT 560° FOR 1 HOUR. THEREAFTER, A LASER BEAM IS IRRADIATED AT 80° TO THE LONGITUDINAL DIRECTION OF THE THIN STRIP OF THIS ALLOY. THEREAFER, THE RESULTANT THIN STRIP IS LAMINATED ANND ADHERED WITH A 0.2 mm THICK PET. | 84.0 |
| 44 | $Fe_{72}Cu_1V_6Si_{14}B_7$ (ULTRA FINE CRYSTAL) | 95 | 13.0 | 7.7 | THIS ALLOY IS HEAT TREATED AT 560° FOR 1 HOUR. THEREAFTER, THE RESULTANT THIN STRIP IS HEAT TREATED IN A MAGNETIC FIELD IN THE DIRECTION OF THE WIDTH OF THE THIN STRIP. THEREAFTER, THE RESULTANT THIN STRIP IS LAMINATED AND ADHERED WITH A 0.2 mm THICK PET. | 84.0 |

COMPARISON EXAMPLE 3

| 45 | IRON POWDER + RESIN (3 WEIGHT %) | 500 | — | — | THE IRON POWDER IS MIXED WITH A RESIN. AFTER THE RESULTANT SUBSTANCE IS HARDENED, IT IS INSERTED INTO EACH SLOT PORTION | 82.0 |
|---|---|---|---|---|---|---|
| 46 | IRON POWDER + RESIN (1 WEIGHT %) | 250 | — | — | | 82.2 |
| 47 | FERRITE WEDGE | $10^6$ | 4.8 | — | | 82.1 |
| 48 | $Fe_{80}B_{20}$ | 115 | 16.8 | 35.0 | THIS ALLOY IS LAMINATED IN PARALLEL WITH THE CENTER DIRECTION OF THE IRON CORE | 82.6 |
| 49 | $Fe_{70}Co_{10}B_{20}$ | 120 | 17.3 | 33.0 | THIS ALLOY IS LAYERED FIVE TIMES ON A 0.2 mm THICK PET. | 82.7 |

TABLE 2-continued

| SAMPLE NO. | ALLOY COMPOSITION | ELECTRIC RESISTANCE ($\mu\Omega \cdot cm$) | SATURATED MAGNETIC FLUX | THICKNESS ($\mu m$) | CONSTRUCTION | EFFICIENCY (%) |
|---|---|---|---|---|---|---|
| 50 | Fe$_{70}$Co$_{10}$B$_{20}$ (WIRE DIAMETER: 120 $\mu$m) | 120 | 17.3 | — | THIS ALLOY IS PLACED ON A 0.2 mm THICK PET AND THEN ADHERED WITH A RESIN. AFTER THE RESULTANT ALLOY IS HARDENED, IT IS INSERTED INTO EACH SLOT PORTION. | 82.2 |
| 51 | Ni | 7 | 6.0 | 20.0 | THE ALLOY IS LAMINATED WITH A 0.2 mm THICK PET. THEREAFTER, A 2$\mu$ THICK INSULATING LAYER IS COATED ON THE RESULTANT THIN STRIP. | 81.9 |

The slot insertion property with respect to the magnetic wedges according to the embodiment 3 (sample Nos. 1, 8, 13, 27, 32, and 35) and the magnetic wedges according to the comparison example 3 (sample Nos. 48 and 49) was evaluated. No chips were found in the magnetic wedges according to the embodiment 3. On the other hand, in the magnetic wedges according to the comparison example 3, approximately 15% of the magnetic wedges of the sample No. 48 were divided into two parts due to peel-off from the adhered portions. In addition, approximately 20% of the magnetic wedges of the sample No. 49 were observed that laminated magnetic layers were torn off. Thus, it is clear that the magnetic wedges according to the present invention provides a high reliability. Moreover, with respect to the magnetic wedges according to the embodiment 3 (sample Nos. 6 and 23) and those according to the comparison example 3 (sample No. 45), the noise generation tests at the time of operation were conducted by using noise measurement equipment. The noise generation of the former was lesser than that of the latter by 8%. Thus, it was found that the formation of the conductive layer had a remarkable effect against noise.

Embodiment 4

Crystalline magnetic alloys shown in Table 3 were made. Thereafter, the alloys were heat treated at optimal temperatures in the range from 800° C. to 1100° C. Thereafter, the alloys were laminated and adhered with polyester films and then they were evaluated as magnetic wedges in the same manner as that in the embodiment 1. In this embodiment, a resin of urethane type was used as an adhesive agent.

TABLLE 3

|  | Alloy composition | Electric resistance ($\mu\Omega \cdot cm$) | Ribbon thickness ($\mu m$) | Saturated magnetic flux density (kG) | Efficiency (%) |
| --- | --- | --- | --- | --- | --- |
| Embodiment 4 | $Fe_{95}Si_5$ | 45 | 40 | 18.9 | 82.8 |
|  | $Fe_{93}Cr_2Si_5$ | 55 | 40 | 17.2 | 82.9 |
|  | $Fe_{90}Mn_2Si_8$ | 60 | 50 | 14.5 | 82.9 |
|  | $Ni_{79}Fe_{18}Nb_3$ | 55 | 20 | 8.1 | 83.0 |
|  | $Ne_{78.5}Fe_{18.0}Ta_{3.0}Si_{0.3}Mn_{0.2}$ | 65 | 15 | 7.9 | 83.1 |
| Comparison example 4 (PET) |  | — | 200 | — | 82.0 |

As becomes clear with Table 3, even if crystalline magnetic alloy ribbons are used, high efficiency of the motor can be achieved.

Industrial Utilization

As was described, according to the present invention, since a magnetic material layer with an electric resistance in the range from 10 $\mu\Omega$.cm to 200 $\mu\Omega$.cm is used, a slot insulating magnetic wedge in a simple and thin construction with the sufficient function of a magnetic wedge can be provided. Thus, the slot insulating magnetic wedges according to the present invention remarkably contributes to the improvements of the efficiencies and reliabilities of the motors.

What is claimed is:

1. A slot insulating magnetic wedge inserted into a vicinity of a center of an opening portion of a stator slot, said slot insulating magnetic wedge being in contact with an inner surface of said stator slot of a motor, said slot insulating magnetic wedge comprising:
   a non-magnetic insulating thin leaf shaped material, and
   a magnetic material layer laminated on at least one surface of said non-magnetic insulating thin leaf shaped material, said magnetic material layer comprising a Co-based amorphous magnetic alloy thin ribbon with a composition substantially represented with the following general formula:

$$(Co_{1-a-b}M_aM'_b)_{100-c}X_c$$

where M is at least one element selected from Fe, Ni, and Mn; M' is at least one element selected from V, Nb, Ta, Cr, Mo, and W; X is at least one element selected from Si, B, P, and C; a, b and c are values which satisfy the relations of $0.01 \leq a \leq 0.2$, $0 \leq b \leq 0.1$, and 8 atomic % $\leq c \leq$ 32 atomic %, respectively.

2. The slot insulating magnetic wedge as set forth in claim 1, wherein said Co-based amorphous magnetic alloy thin ribbon has a saturated magnetic flux density in the range from 3 kG to 13 kG.

3. The slot insulating magnetic wedge as set forth in claim 1, wherein the thickness of said Co-based amorphous magnetic alloy thin ribbon is in the range of 1 $\mu m$ to 100 $\mu m$.

4. The slot insulating magnetic wedge as set forth in claim 1, wherein a metal film with a thickness of 50 $\mu m$ or less is formed on a surface of said Co-based amorphous magnetic alloy thin ribbon, and the electric conductivity of said metal film is higher than that of said Co-based amorphous magnetic alloy thin ribbon.

5. A slot insulating magnetic wedge inserted into a vicinity of a center of an opening portion of a stator slot, said slot insulating magnetic wedge being in contact with an inner surface of said stator slot of a motor, said slot insulating magnetic wedge comprising:
   a non-magnetic insulating thin leaf shaped material, and
   a magnetic material layer laminated on at least one surface of said non-magnetic insulating thin leaf shaped material, said magnetic material layer comprising a Fe-based amorphous magnetic alloy thin ribbon with a composition substantially represented with the following general formula:

$$(Fe_{1-d}M''_d)_{100-e}X_e$$

where M'' is at least one element selected from B, Nb, Ta, Cr, Mo, W, Ni, Co, and Cu; X is at least one element selected from Si, B, P, and C; and d and e are values which satisfy the relations of $0 \leq d \leq 0.1$ and 15 atomic % $\leq e \leq$ 30 atomic %, respectively.

6. The slot insulating magnetic wedge as set forth in claim 5, wherein said Fe-based amorphous magnetic alloy thin ribbon has a saturated magnetic flux density in the range of from 3 kG to 17.5 kg.

7. The slot insulating magnetic wedge as set forth in claim 5, wherein the thickness of said Fe-based amorphous magnetic alloy thin ribbon is in the range of 1 μm to 100 μm.

8. The slot insulating magnetic wedge as set forth in claim 5, wherein a metal film with a thickness of 50 μm or less is formed on a surface of said Fe-based amorphous magnetic alloy thin ribbon, and the electric conductivity of said metal film is higher than that of said Fe-based amorphous magnetic alloy thin ribbon.

9. A slot insulating magnetic wedge inserted into a vicinity of a center of an opening portion of a stator slot, said slot insulating magnetic wedge being in contact with an inner surface of said stator slot of a motor, said slot insulating magnetic wedge comprising:
- a non-magnetic insulating thin leaf shaped material, and
- a magnetic material layer laminated on at least one surface of said non-magnetic insulating thin leaf shaped material, said magnetic material layer comprising a Fe-based magnetic alloy thin ribbon having ultra fine crystalline particles with a composition substantially represented with the following general formula:

$$Fe_{100-f-g-h-i-j}D_f E_g Si_h B_i Z_j$$

where D is at least one element selected from Cu and Au; E is at least one element selected from group IVa elements, group V elements, and group VI elements; Z is at least one element selected from C, N, and P; and f, g, h, i, and j are values which satisfy the relations of 0.1 atomic $\% \leq f \leq 8$ atomic %, 0.1 atomic $\% \leq g \leq 10$ atomic %, 10 atomic $\% < h \leq 25$ atomic %, 4 atomic $\% \leq i \leq 12$ atomic %, and 0 atomic $\% \leq j \leq 3$ atomic %, respectively, said ultra fine crystalline particles having a diameter of 50 μm or less.

10. The slot insulating magnetic wedge as set forth in claim 9, wherein the thickness of said Fe-based magnetic alloy thin ribbon is in the range of 1 μm to 100 μm.

11. The slot insulating magnetic wedge as set forth in claim 9, wherein a metal film with a thickness of 50 μm or less is formed on a surface of said Fe-based magnetic alloy thin ribbon, and the electric conductivity of said metal film is higher than that of said Fe-based magnetic alloy thin ribbon.

* * * * *

UNITED STATES PATENT AND TRADEMARK OFFICE
CERTIFICATE OF CORRECTION

PATENT NO. : 5,252,877
DATED : October 12, 1993
INVENTOR(S) : Takao Sawa et al.

It is certified that error appears in the above-indentified patent and that said Letters Patent is hereby corrected as shown below:

Claim 5, column 20, line 57, change "from B," to --from V,--.

Claim 9, column 22, line 11, change "%<$\underline{h}$<25" to --%$\leq$$\underline{h}$$\leq$25--.

Signed and Sealed this

Eleventh Day of October, 1994

Attest:

BRUCE LEHMAN

Attesting Officer        Commissioner of Patents and Trademarks